April 14, 1931.  R. KRAUSS  1,801,091
HIGH PRESSURE WATER PIPE
Filed May 18, 1929  2 Sheets-Sheet 1
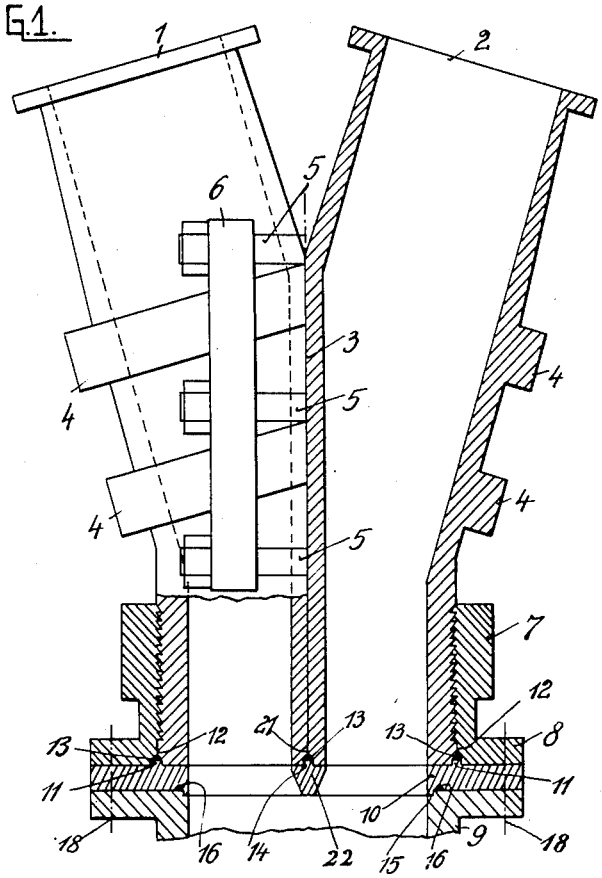
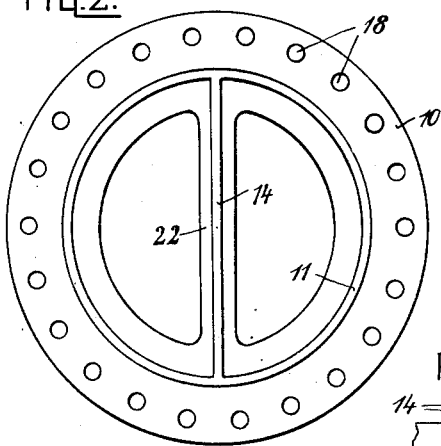
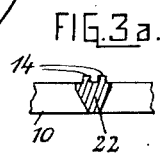
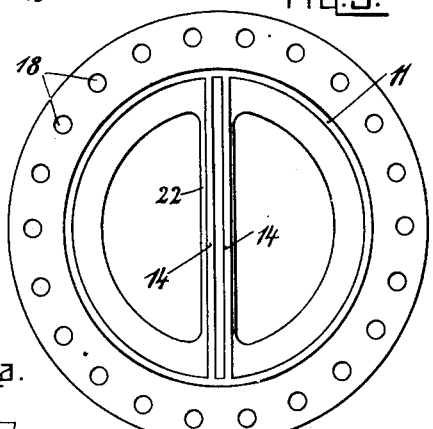
Inventor:
Richard Krauss
by Richard E. Babcock
Attorney April 14, 1931.  R. KRAUSS  1,801,091
HIGH PRESSURE WATER PIPE
Filed May 18, 1929  2 Sheets-Sheet 2

Inventor:
Richard Krauss
by Richard E. Babcock
Attorney

Patented Apr. 14, 1931

1,801,091

UNITED STATES PATENT OFFICE

RICHARD KRAUSS, OF BRESLAU, GERMANY

HIGH-PRESSURE WATER PIPE

Application filed May 18, 1929, Serial No. 364,169, and in Germany May 22, 1928.

The present invention relates to high pressure water pipes and more particularly to connections between a siphon pipe and a completely cylindrical pipe which are capable of withstanding pressures of more than 100 atmospheres.

The object of the invention is to produce a sealing between the siphon pipe and the sleeve holding the two branch pipes of the latter together which is thoroughly reliable even at such high pressures and by means of which the siphon pipe is united with the completely cylindrical pipe.

This reliable sealing is obtained by sealing the union between the siphon pipe and the connecting sleeve embracing the semi-cylindrical ends of the two branches of the siphon pipe by means of a suitable annulus or washer and by sealing the union between the semi-cylindrical ends of the two branch pipes by means of a bridge passing transversely across the washer.

If the sealing of the above mentioned joints is carried out in the lower end of the siphon pipe, a ring can be used which forms an integral unit with the bridge. If on the other hand the sealing is effected at the upper edge of the connecting sleeve two half rings are preferably used, in order to allow of easy interchangeability, to seal the joint running around the siphon pipe, the bridge serving to seal the joints between the two branch pipes being in this case inserted in a channel which is produced by the provision of grooved recesses opposite one another in each of the contacting flat walls of the two branch pipes.

The sealing between the siphon pipe and the connecting sleeve and also between the two branch pipes themselves is explained in detail in the following description with reference to the accompanying drawings.

In the drawings:—

Figure 1 is a longitudinal section through one branch pipe and the semi-cylindrical end of the other branch of the siphon pipe and also through the connecting sleeve embracing the ends of both branch pipes, the sealing annulus or washer provided with a central bridge and the attached end of the full cylindrical pipe. The portion of the second branch pipe located above the connecting sleeve is shown in elevation.

Figure 2 is a plan view from above of the sealing annulus attached to the lower end of the siphon pipe and provided with a central bridge in the arrangement of a single packing joint attached to the joint extending around externally between the two adjacent semi-cylindrical ends of the siphon pipe.

Figure 3 is also a plan view from above of a modification of the sealing annulus provided with a central bridge in the arrangement of a sealing joint in the lower ends of the flat-walled portion of each of the two branch pipes.

Figure 3a is a section through the central bridge of the modification of the sealing annulus shown in Figure 3.

Figure 4:
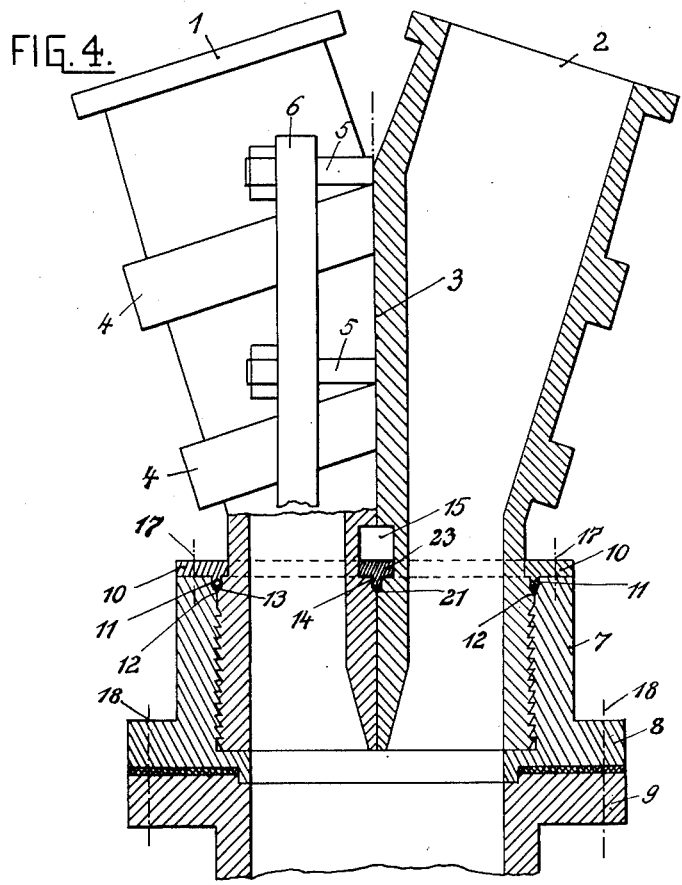
Figure 4 is a longitudinal section corresponding to Figure 1 with a sealing annulus arranged at the upper edge of the connecting sleeve and formed of two half rings and a special central bridge inserted between the branch pipes.

The siphon pipe consists of the branch pipes 1 and 2 provided with strengthening ribs 4 on which are cast bridges 6 connected together by screws 5 so that a rigid union of the branch pipes 1 and 2 is provided. The semi-cylindrical connecting ends of the branch pipes 1 and 2 are secured together by a shrunk-on sleeve 7 and are connected with a completely cylindrical pipe 9 by screwing the flange 8 of the sleeve 7 to the flange of the cylindrical pipe. The screws used for this purpose are not shown in the drawing but the position of these screws is indicated in Fig. 1 by the dotted lines 18 and in Figs. 2 and 3 by the screw holes which are also indicated by the reference 18.

The sealing of the joint 12 which is located between the siphon pipe and the connecting sleeve 7 embracing the semi-cylindrical ends of the branch pipes 1 and 2, and the sealing of the joint 21 located between the flat walls 3 of the semi-cylindrical branch pipes 1 and 2 is effected according to the invention by means of an annulus or washer 10 and a bridge 22 passing transversely thereof. If, as is shown in Figure 1, the sealing of this joint is carried out in the lower end of the siphon pipe then the sealing washer 10 is arranged between the flange 8 of the sleeve 7, embracing the branch pipes 1 and 2, and the flange of the completely cylindrical pipe 9 and such washer is secured to the flanges by means of the screws for which holes 18 are provided substantially adjacent the perimeter of the washer. In this case the washer 10 can form an integral unit with the central bridge in accordance with Figures 1–3.

The sealing annulus or washer 10 is provided according to Figures 1 and 2 with an annular rib 11 in the form of an upstanding projection by means of which the sealing material 13 is pressed into the annular joint 12 located between the semi-cylindrical branch pipes 1 and 2 and the connecting sleeve 7. A rib 14 is also provided (Fig. 2) on the central bridge 22 of the annulus 10, this rib 14 merging at its ends into the annular rib 11 and serving to seal the joint 21 located between the flat walls 3 of the branch pipes 1 and 2. Sealing material 13 is interposed between the ribs and the various elements. The course of the joints 12 and 21 passing over into one another in the siphon pipe shown in Fig. 1 which forms a closed line, has a similar corresponding course in the ribs 11 and 14 of the annulus or washer 10 and its corresponding central bridge 22 in Fig. 2. The semi-cylindrical connecting ends of the branch pipes 1 and 2 may each possess its own sealing groove in the straight wall. In this case the central bridge 22 of the washer 10, as shown in Figs. 3 and 3a, is provided with two ribs 14 corresponding to these joints which pass over into the annular ribs 11 similarly as in the construction of the joints and the sealing ring as shown in Figs. 1 and 2. The arrangement of a sealing groove in each of the straight walls in the lower edge of the branch pipe is not particularly shown in the drawings, but the relevant arrangement can easily be understood by the two sealing ribs 14—14 in Figures 3 and 3a.

The sealing annulus 10 engages towards the full cylindrical pipe 9 in a suitable recess in the main pipe 9 by means of a centring ring 15 provided on its internal edge and is sealed from the main pipe 9 at this side by means of the joint 16 filled with packing material.

Figure 5:
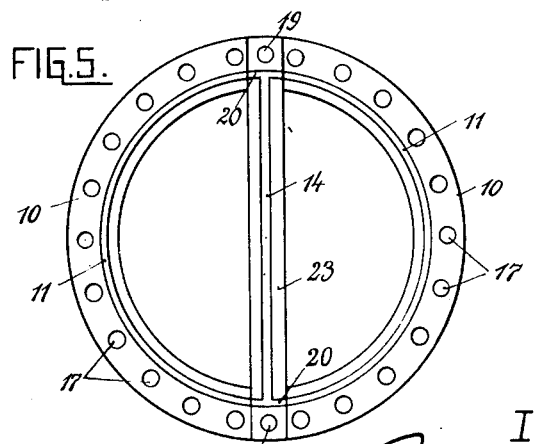
Figure 5 is a plan view from below of the half rings shown in section in Figure 4 and the corresponding central bridge.

If the sealing of the joint 12 located between the branch pipes 1 and 2 and the connecting sleeve 7 and the sealing of the joint 21 located between the flat walls 3 of the branch pipes 1 and 2 is effected as shown in Figure 4 i. e. at the upper edge of the connecting sleeve 7, the sealing annulus or washer 10 is made in a plurality of parts and in order to allow of easy interchangeability consists, for example as shown in Fig. 5 of two half rings 10 each provided with a semi-annular rib 11, which are provided at the edge with holes 17 for the screws indicated by the dotted lines 17 in Figure 4 securing the half rings to the upper edge of the connecting sleeve 7. The semi-annular ribs 11 of the sealing annulus 10 are adapted to seal the joint 12 located between the semi-cylindrical branch pipes 1 and 2 and the connecting sleeve 7. A bridge 23 passing transversely through the sealing ring, but which in this case is constructed separately and inserted in a channel 15¹, again serves to seal the joint 21 located between the flat walls 3 of the branch pipes 1 and 2. This channel 15¹ is formed of grooved opposite recesses in the flat walls 3 of the branch pipes 1 and 2 and is accessible from without so that all the sealing points can be inspected and both the half rings 10 of the sealing ring and also the bridge 23 sealing the joint 21 located between the flat walls 3 of the branch pipes 1 and 2 can be exchanged as desired during operation without having previously to release the connection of the siphon pipe with the full cylindrical pipe 9.

The sealing rib 14 of the bridge 23 is provided at each of its ends with a transverse arcuate rib 20 which passes over into the ribs 11 arranged on the two half rings 10. The bridge 23 itself is provided at its ends with holes 19 through which screws can be inserted to secure the bridge 23 to the upper edge of the connecting sleeve 7.

I declare that what I claim is:—

1. In a high pressure water pipe provided with two branch pipes, the combination of the semi-cylindrical ends of the two branch pipes with a connecting sleeve, an annular washer adapted for sealing the union between the said sleeve and the semi-cylindrical surfaces of the branch pipes and a central bridge adapted for sealing the joints between the two flat walls of the branch pipes.

2. In a high pressure water pipe provided with two branch pipes, the combination of the semi-cylindrical ends of the two branch pipes with an internally threaded cylindrical sleeve adapted for engagement around the semi-circular ends of the branch pipes, an annular washer provided with a central bridge, means for providing a fluid tight joint between said washer, said sleeve and the curved portions of said semi-circular ends of said branch pipes and means for providing a fluid-tight joint between the flat portions of the walls of the semi-circular pipes and said bridge.

3. In a high pressure water pipe provided with two branch pipes, the combination of the semi-cylindrical ends of the two branch pipes with an internally threaded cylindrical sleeve adapted for engagement around the semi-circular ends of the branch pipes, an annular washer composed of two half rings each having a semi-annular sealing rib for sealing the joint running around the upper edge of the said sleeve and also of a bridge provided at least with one sealing rib and inserted in a channel produced by recesses in the flat walls of the branch pipes and adapted to seal the joint located between the two branch pipes.

In testimony whereof, I have signed my name to this specification at Breslau, Germany, this 7th day of May, 1929.

RICHARD KRAUSS.